UNITED STATES PATENT OFFICE 2,125,951

FINISHING COMPOSITION AND FLATTING AGENT FOR USE THEREIN

Robert E. Parry, North Plainfield, N. J., assignor to Johns-Manville Corporation, New York, N. Y., a corporation of New York No Drawing. Application March 9, 1933, Serial No. 660,101. Renewed October 22, 1937

4 Claims. (Cl. 134—79)

This invention relates to a finishing composition, particularly to one adapted to produce a flat or mat finish, and to the flatting agent adapted for use therein.

Finishing compositions that produce a flat or mat effect are in wide use. Flat lacquers, for example, are much used in the furniture industry. They contain conventional lacquer ingredients and, in addition, a flatting ingredient such as aluminum stearate.

It is an object of this invention to provide a finishing composition of improved properties and a flatting ingredient for use therein that is inexpensive, stable, insoluble in the vehicle commonly used in paints or lacquers, non-volatile, that does not leave a greasy film on the surface of a lacquer film or the like, that does not form a hard cake upon settling from the finishing composition, and that is preferably non-pigmentary and, therefore, does not modify an otherwise established color or impart color to a colorless composition, to a substantial degree. Other objects and advantages will appear as the detailed description of the invention progresses.

The invention comprises a finishing composition including a film-forming ingredient, as, for example, a cellulose ester, a drying oil, and/or a resin, a solid, finely divided, non-pigmentary ingredient, and a cake-softening agent, that is, an ingredient adapted to impart to the said solid material, when settled from the finishing composition, the property of being readily redistributable through the finishing composition. In the preferred embodiment, the invention comprises a lacquer including pyroxylin, a solvent therefor including a water-soluble ingredient, comminuted diatomaceous earth that contains a small proportion of silicic acid or a water-soluble silicate and, intimately associated with the diatomaceous earth, a cake-softening agent.

The finishing composition comprises ingredients selected from the following groups:

(1) A film-forming ingredient, as, for example, a cellulose ester, such as pyroxylin or cellulose acetate, a drying oil such as linseed or China-wood oil, and/or a resin. The resin may be natural or synthetic. Thus, it may include ester gum (the substantially neutral reaction product of glycerin and rosin), shellac, dammar, glycerin phthalate, phenol-aldehyde condensation products, or the like. Commonly, these film-forming ingredients are used in mixtures, as, for example, in a composition comprising pyroxylin, a resin, and/or a drying oil, as in a pyroxylin and resin lacquer, or in a varnish.

(2) A volatile solvent or vehicle for the film-forming ingredients, usually a mixture of various substances. Thus, the volatile solvent for the film-forming ingredients of pyroxylin lacquer may include esters, alcohol or other water-soluble ingredients, including a small proportion of water itself which is added with the commercial alcohol or commercially dehydrated pyroxylin, and hydrocarbon diluents such as toluol or cleaner's naphtha. Other water-soluble ingredients that may be present are isopropyl or other, lower secondary alcohols or hydroxy-esters, as, for example, ethyl lactate or ethyl oxybutyrate.

(3) Finely divided, solid flatting material adapted, ordinarily, to form a relatively hard cake when settled from a composition comprising a mixture of ingredients of the type described in paragraphs (1) and (2) above, as, for example, finely divided siliceous material containing a small proportion of a somewhat water-soluble binder such as a silicate compound, say a water-soluble alkali metal silicate or hydrous silicic acid. This alkali metal silicate or silicic acid is present, in part at least, in the exterior portions of the particles of the comminuted diatomaceous earth. Particularly suitable is the comminuted diatomaceous earth made by calcining natural diatomaceous earth, in powdered form, with a small amount of salt, sodium carbonate, or other chemical admixture adapted to flux clay, all as described in U. S. Patent 1,502,547, issued to Calvert, Dern and Alles, on July 22, 1924. Such a product contains an appreciable proportion of an alkali metal silicate formed upon the siliceous particles by the action of the fluxes at the temperature of calcination and integrally united to the particles. Subsequent to the calcination, the product is cooled and suitably dispersed, as by being passed through a series of blowers. It is then separated largely from the resulting air-stream suspension, say in settling chambers. The material that does not settle readily in the chambers, that remains suspended the longest, is very finely divided. This fraction may be recovered by passing the air stream containing it through a fabric dust collector or filter. Thus, there is obtained a very finely divided fraction, the particles of which are less than 4 microns in size, as measured by the Oden sedimentation test, and are usually approximately 2 microns or finer in average size. A typical very finely divided diatomaceous product, that has been found to be especially suitable for purposes of the present invention, contains 2% by weight of particles that are coarser than 10 microns, 80% of particles that are smaller than 10 and coarser than 2 microns, and 18% that are finer than 2 microns.

(4) A cake-softening (anti-caking) agent, a material of the general property of causing the finely divided flatting material of type specified in paragraph (3), upon being settled from its suspension in a mixture of ingredients of types described in paragraphs (1) and (2), to form into a settled mass that is not hard, that is, is readily redistributable, as by being stirred into suspension. The cake-softening ingredient should have also the general property of preventing the development of an adhesive tendency between the individual particles of flatting material in the presence of water-soluble ingredients in the volatile solvent. Examples of such cake-softening agents are water-insoluble, protective colloids, such as aluminum stearate, and compounds of multivalent metals which are appreciably soluble in the volatile solvent used, particularly in the water-soluble ingredient thereof, and ionized therein. These cake-softening ingredients having the common property of preventing hard caking of the flatting material function, presumably, in the same manner. Thus, when the flatting material used in a lacquer is very finely divided diatomaceous earth containing a small proportion of water-soluble silicate compound adapted to be adhesive when wet, the compounds of the multivalent metals of type specified, as, for example, calcium nitrate or chloride and aluminum chloride become intimately associated with the said particles and prevent also the solution of the silicate compound, perhaps by reacting with it to form an insoluble silicate or by coagulating it from colloidal condition. Such metal compounds are used in excess of the silicate compound. The cake-softening agent may be hereinafter referred to as the cake-redistributing agent, inasmuch as the latter term seems to state well the primary function of such agent.

Methods of practicing the invention are illustrated in the following specific examples. In these examples and elsewhere in the specifications and claims, all proportions are expressed as parts by weight.

*Example I.*—There is provided a finely divided diatomaceous earth made by a process including calcination in finely divided form with a small proportion of flux, as described in the said patent to Calvert, Dern and Alles. This product contains a small proportion of water-soluble silicate.

A diatomaceous earth product so prepared is ball-milled or otherwise coated with aluminum stearate, say in the proportion of 10 to 20 parts of the stearate to 100 parts of the diatomaceous earth. The thus coated diatomaceous earth is then incorporated into a lacquer in suitable manner.

*Example II.*—Example I is modified in that the aluminum stearate is formed into a dilute solution, in warm benzol or the like, and is then mixed with the diatomaceous earth. The resulting mixture is then incorporated into a lacquer.

*Example III.*—Very finely divided diatomaceous earth containing an appreciable proportion of a water-soluble silicate compound is intimately associated with an admixed salt or other compound, preferably of a multivalent metal, that is at least appreciably soluble and ionized in the presence of the water-soluble ingredient of volatile solvent of type described in paragraph (2). Thus, the diatomaceous earth is ground with calcium nitrate or calcium chloride or is mixed with an alcoholic solution of the calcium compound, the proportion of calcium nitrate or chloride being suitably 4 to 8 parts for 100 parts of the diatomaceous earth. The resulting mixture is then incorporated into a lacquer containing conventional ingredients.

In cases where the presence of aluminum chloride is not objectionable, aluminum chloride may be substituted for the calcium salts. In general, the particular salt chosen will depend in part upon the pH value desired in the finishing composition.

*Example IV.*—Examples I to III, inclusive, are modified, in that the lacquer therein specified is substituted by a varnish. The varnish may contain usual ingredients, including a drying oil, a resin, preferably one including a hydroxyl group, say shellac or a spirit-soluble copal, adapted to render adherent particles of diatomaceous earth containing a small proportion of a water-soluble silicate compound or the like, and a vehicle such as kerosene or turpentine. The proportion of diatomaceous earth and cake-softening ingredient should be about 10 to 25 parts for 100 parts of the varnish.

*Example V.*—Examples I to III are modified in that the lacquer is substituted by a solution comprising a synthetic resin as the chief film-forming ingredient. Thus, the improved flatting material and the admixed cake-softening agent are incorporated into a solution comprising volatile solvent and glycerin phthalate, say in the form of Glyptal lacquer, vinylite resin (a polymerized vinyl compound), or a phenol-aldehyde condensation product.

In each case the effect of the anti-caking ingredient is most pronounced when the solution contains an ingredient adapted to render adhesive the silicate compound in the flatting material.

The invention is not limited to any theory of explanation of the results obtained. Since the benefit of the cake-softening ingredients is most pronounced in the presence of a water-soluble ingredient in the solvent and since such an ingredient should have at least a slight swelling or solvent action upon a water-soluble metal silicate or hydrous silicic acid, to impart adhesive properties thereto, it is probable that the cake-softening ingredient coacts with such a silicate to minimize the caking or adhesive properties of the latter.

It will be understood that the compounds of the multivalent metals, such as calcium or aluminum, may react with the silicate compound present in the diatomaceeous earth or with other ingredients of the lacquer; statements in the claims specifying the presence of such compounds are meant to indicate the presence either of the compounds themselves or of their reaction products.

The details that have been given are for the purpose of illustration, not restriction, and many variations therefrom may be made without departing from the spirit and scope of the invention.

What I claim is:

1. A lacquer comprising a cellulose ester, a volatile solvent therefor including a water-soluble ingredient, comminuted diatomaceous earth that contains a small proportion of a water-soluble silicate compound and aluminum stearate associated therewith, the stearate being adapted to promote redispersion of the diatomaceous earth after being settled from the said lacquer.

2. A lacquer comprising a cellulose ester, a volatile solvent therefor including a water-soluble ingredient, comminuted diatomaceous earth containing a small proportion of a water-soluble silicate cake-softening compound, and, associated therewith, a compound of a multivalent metal that is appreciably soluble in the water-soluble ingredient of the said solvent and ionized therein, the said compound being adapted to promote redispersion of the diatomaceous earth settled from the said lacquer.

3. A flat lacquer comprising a film-forming ingredient, a volatile solvent therefor, very finely divided diatomaceous earth in the proportion of approximately 2 to 5 parts for each 100 parts of the said lacquer, and aluminum stearate in the proportion of approximately 10 to 20 parts to each 100 parts of the said diatomaceous earth, the said stearate being adapted to promote redispersion of the diatomaceous earth settled from the said lacquer.

4. A finishing composition, comprising an intimate mixture of film-forming material, a liquid vehicle, finely divided particles of diatomaceous earth having in the exterior parts thereof a small proportion of silicic acid or an alkali metal silicate, and a cake-redistributing agent, the said agent including a salt of a multivalent metal that is appreciably soluble in the said vehicle and is present in amount sufficient to make readily redistributable the cake formed on settling of the said particles from the composition.

ROBERT E. PARRY.